US012464414B2

United States Patent
Akdim et al.

(10) Patent No.: US 12,464,414 B2
(45) Date of Patent: Nov. 4, 2025

(54) ENHANCED VOICE CALL ESTABLISHMENT WITH NETWORK SLICING APPLICATIONS

(71) Applicant: Apple Inc., Cupertino, CA (US)

(72) Inventors: Nabil Akdim, Munich (DE); Gencer Cili, San Jose, CA (US); Lakshmi N. Kavuri, Cupertino, CA (US); Madhavi Duvvuru, Saratoga, CA (US); Rawad Rahme, Munich (DE)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 18/365,353

(22) Filed: Aug. 4, 2023

(65) Prior Publication Data

US 2025/0048191 A1    Feb. 6, 2025

(51) Int. Cl.
*H04W 36/00* (2009.01)

(52) U.S. Cl.
CPC . *H04W 36/00222* (2023.05); *H04W 36/0058* (2018.08)

(58) Field of Classification Search
CPC ....... H04W 36/00222; H04W 36/0058; H04W 36/00224
See application file for complete search history.

(56) References Cited

U.S. PATENT DOCUMENTS

| | | | |
|---|---|---|---|
| 2021/0051530 A1* | 2/2021 | Venkataraman | ...... H04W 76/12 |
| 2023/0231890 A1* | 7/2023 | Rahman | .................. H04L 65/80 |
| | | | 455/426.1 |
| 2023/0388870 A1* | 11/2023 | Ali | ........................ H04W 48/18 |
| 2024/0031876 A1* | 1/2024 | Cui | ................. H04W 36/00224 |

OTHER PUBLICATIONS

Partial Search Report for PCT/US2024/040678; Nov. 26, 2024.

* cited by examiner

*Primary Examiner* — Ping Y Hsieh
(74) *Attorney, Agent, or Firm* — Kowert, Hood, Munyon, Rankin & Goetzel, P.C.

(57) ABSTRACT

A user equipment (UE) may initiate an application on a user equipment (UE) which utilizes a network slice via a packet data network (PDN) connection with a first cellular network. The first cellular network may support network slicing and voice over new radio (VONR) and one or more cells of the first cellular network may support evolved packet system (EPS) fallback procedures. The UE may receive or initiate a voice call with another UE and adjust one or more capabilities of the UE such that an EPS fallback procedure is deemphasized. The UE may receive signaling from the first cellular network to establish, based at least in part on the one or more adjusted capabilities of the UE, the voice call as a VoNR call via the first cellular network and the network slice may be maintained during the VoNR call.

20 Claims, 12 Drawing Sheets

ENHANCED VOICE CALL ESTABLISHMENT WITH NETWORK SLICING APPLICATIONS

FIELD

The invention relates to wireless communications, and more particularly to apparatuses, systems, and methods for enhanced voice call establishment with network slicing applications.

DESCRIPTION OF THE RELATED ART

Wireless communication systems are rapidly growing in usage. In recent years, wireless devices such as smart phones and tablet computers have become increasingly sophisticated. Wireless devices such as smart phones support telephony and in addition provide access to the Internet, email, text messaging, and navigation using the global positioning system (GPS), and are capable of operating sophisticated applications that utilize these functionalities.

Some examples of wireless communication standards include UMTS (associated with, for example, WCDMA or TD-SCDMA air interfaces), LTE, LTE Advanced (LTE-A), HSPA, IEEE 802.11 (WLAN or Wi-Fi), IEEE 802.16 (WiMAX), Bluetooth, and others.

Long Term Evolution (LTE) is a fairly recent standard that is supported by the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

As demand for wireless communication systems grows and new use cases for wireless communication arise, there is a seemingly continual need to develop next generation wireless communication techniques and standards. One such developing concept may include network slicing, which may allow a network operator to create different "network slices" configured to address different wireless communication use cases and scenarios in a customized manner.

SUMMARY

Embodiments relate to wireless communications, and more particularly to apparatuses, systems, and methods for enhanced voice call establishment with network slicing applications.

In some embodiments, a user equipment (UE) may initiate an application on a user equipment (UE) which utilizes a network slice via a packet data network (PDN) connection with a first cellular network. The first cellular network may support network slicing and voice over new radio (VoNR) and one or more cells of the first cellular network may support evolved packet system (EPS) fallback procedures associated with a transition to a second cellular network that does not support network slicing. The UE may receive or initiate a voice call with another UE and adjust one or more capabilities of the UE such that an EPS fallback procedure is deemphasized. The UE may receive signaling from the first cellular network to establish, based at least in part on the one or more adjusted capabilities of the UE, the voice call as a VoNR call via the first cellular network and the network slice may be maintained during the VoNR call.

According to some embodiments, the UE may further determine, as part of a UE capability sharing procedure between the UE and the first cellular network, whether one or more feature flag equalities are satisfied. Additionally or alternatively, the one or more capabilities may include the one or more feature flag equalities including VoIMS=True, VOLTESupported=True, and VoNrSupported=True. In some embodiments, the UE may adjust one or more capabilities of the UE such that an EPS fallback procedure is deemphasized by switching VOLTESupported=True to VOLTESupported=False.

In some instances, the UE may provide, via a user interface (UI) of the UE, a message inquiring whether a user of the UE is willing to lose the network slice in order to establish the call. Additionally, the UE may transmit, to the first cellular network, a response to the message indicating whether the user is willing to lose the network slice in order to establish the call.

In some embodiments, the UE may receive, from the first cellular network, a message comprising an inter-radio access technology (IRAT) cell measurement and reporting configuration. Additionally, the message may include a request for the UE to perform measurements of one or more neighboring cells of the second cellular network. The UE may perform, in response to the request, one or more measurements of one or more cells of the second cellular network and adjust the one or more measurements such that the EPS fallback procedure is deemphasized, according to some embodiments.

According to further embodiments, an apparatus may include at least one processor configured to cause a UE to initiate an application on a user equipment (UE) which utilizes a network slice via a packet data network (PDN) connection with a first cellular network. The first cellular network may support network slicing and voice over new radio (VONR) and one or more cells of the first cellular network may support evolved packet system (EPS) fallback procedures associated with a transition to a second cellular network that does not support network slicing. The at least one processor may be further configured to cause the UE to receive, from the first cellular network, a request to perform measurements of one or more neighboring cells of the second cellular network. Additionally, the at least one processor may be further configured to cause the UE to perform one or more measurements of one or more cells of the second cellular network and receive or initiate a voice call with another UE. The at least one processor may be further configured to cause the UE to adjust the one or more measurements of the UE such that an EPS fallback procedure is deemphasized and receive signaling from the first cellular network to establish, based at least in part on the one or more adjusted measurements of the UE, the voice call as a VoNR call via the first cellular network. Additionally, the network slice may be maintained during the VoNR call, according to some embodiments.

In some embodiments, the request to perform measurements of one or more neighboring cells of the second cellular network may include an IRAT cell measurement and reporting configuration. Additionally, the one or more measurements may be adjusted below a threshold value, according to some embodiments. Additionally or alternatively, the at least one processor may further cause the UE to adjust one or more capabilities of the UE such that an EPS fallback procedure is deemphasized.

In some embodiments, the at least one processor may be further configured to cause the UE to determine, as part of a UE capability sharing procedure between the UE and the first cellular network, whether one or more feature flag equalities are satisfied. Additionally, the one or more capabilities may include the one or more feature flags including VoIMS=True, VOLTESupported=True, and VoNrSupported=True. In some embodiments, adjusting the one or more capabilities of the UE such that an EPS fallback procedure is deemphasized may include switching VOLTESupported=True to VOLTESupported=False.

According to some embodiments, a wireless device may include wireless communication circuitry and at least one processor coupled to the wireless communication circuitry and configured to cause the wireless device to initiate an application on the wireless device which utilizes a network slice via a packet data network (PDN) connection with a first cellular network. Additionally, the first cellular network may support network slicing and voice over new radio (VoNR) and one or more cells of the first cellular network may support evolved packet system (EPS) fallback procedures. The at least one processor may be further configured to cause the wireless device to receive or initiate a voice call with another wireless device and perform an EPS fallback procedure. In some embodiments, the EPS fallback procedure may transition the wireless device from the first cellular network to a second cellular network that does not support network slicing. The at least one processor may be further configured to cause the wireless device to receive signaling from the second cellular network to establish the voice call via the second cellular network. Additionally, the network slice may not be not utilized via the PDN connection with the first cellular network during the voice call. The at least one processor may be further configured to cause the wireless device to retransition, based at least in part on the voice call being disconnected from the second cellular network and the application remaining initiated, to the first cellular network and resume utilization of the network slice via the PDN connection with the first cellular network.

According to some embodiments, the application may be being executed in a foreground of the UE. Additionally, VoNR may be disabled on the wireless device based at least in part on the wireless device being in a do-not-disturb (DND) mode.

In some embodiments, the voice call is a mobile terminated (MT) call and the at least one processor may be further configured to cause the wireless device to transmit, in response to receiving the MT call and based at least in part on the wireless device being in a DND mode, a reject message to the network. Additionally, the at least one processor is further configured to cause the wireless device to enable VoNR on the UE. Furthermore, the retransition to the first cellular network may be triggered based on VoNR being enabled on the UE and the application running in a foreground of the UE.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
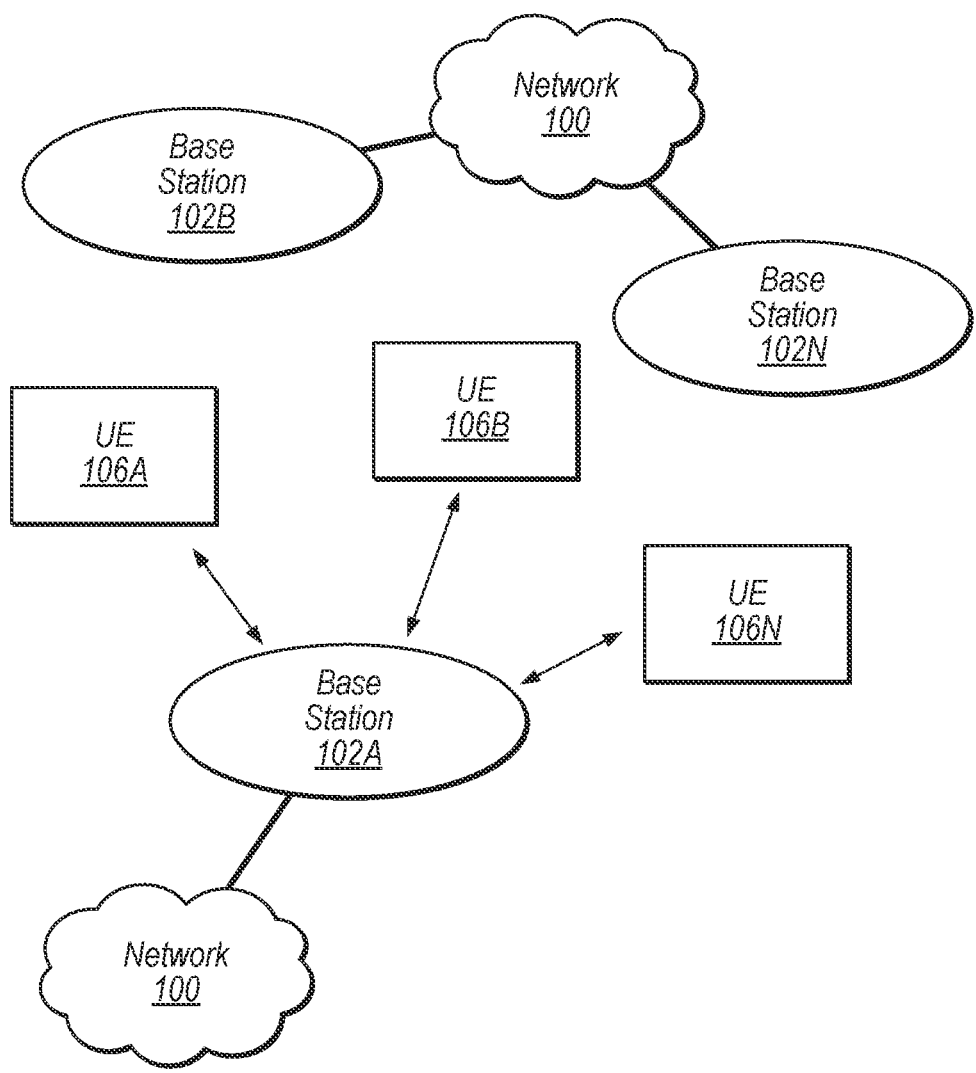
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
APN: Access Point Name
NG-RAN: Next Generation Radio Access Network
AMF: Core Access and Mobility Management Function
SMF: Session Management Function
UPF: User Plane Function
S-NSSAI: Single Network Slice Selection Assistance Information
SST: Slice/service type
URSP: UE Route Selection Policy
SA: Stand Alone.
PDN: Packet Data Network
EPS: Evolved Packet System
NW: Network
QoS: Quality of Service
IP: Internet Protocol
VoNR: Voice over New Radio
VOLTE: Voice over Long Term Evolution
VoPS: Voice over Packet Switched
VoIMS: Voice over IP Multimedia Subsystem
HARQ: Hybrid Automatic Repeat Request
IRAT: Inter-Radio Access Technology
RRC: Radio Resource Control
MO: Mobile Originated
MT: Mobile Terminated
UI: User Interface
SIP: Session Initiation Protocol
E-UTRA: Evolved Universal Terrestrial Radio Access
ENDC: E-UTRA-NR Dual Connectivity (EN-DC)
URLLC: Ultra-Reliable Low-Latency Communication
PDU: Packet Data Unit

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
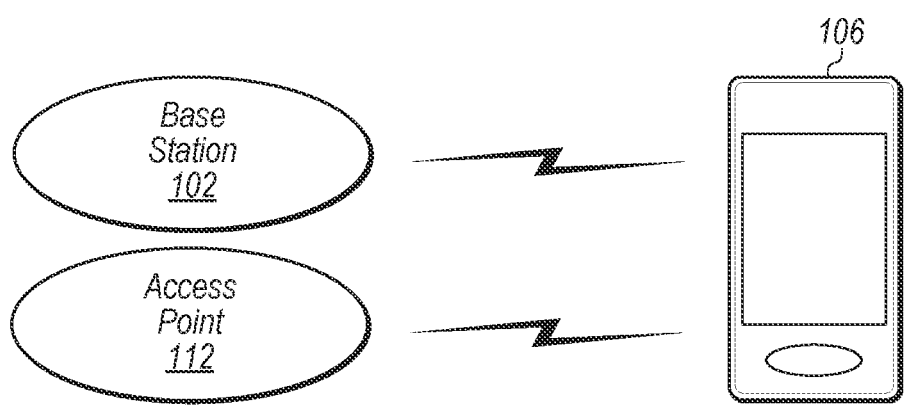
FIG. 2 illustrates an example of a base station (BS) and an access point in communication with a user equipment (UE) device according to some embodiments.

FIGS. 1 and 2—Communication Systems

FIG. 1 illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as UMTS (associated with, for example, WCDMA or TD-SCDMA air interfaces), LTE, LTE-Advanced (LTE-A), 5G new radio (5G NR), HSPA, 3GPP2, etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., UMTS (associated with, for example, WCDMA or TD-SCDMA air interfaces), LTE, LTE-A, 5G NR, HSPA, 3GPP2, etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, LTE/LTE-Advanced, or 5G NR using a single shared radio and/or LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT), and separate radios for communicating using each of Wi-Fi and Bluetooth. Other configurations are also possible.

Figure 3:
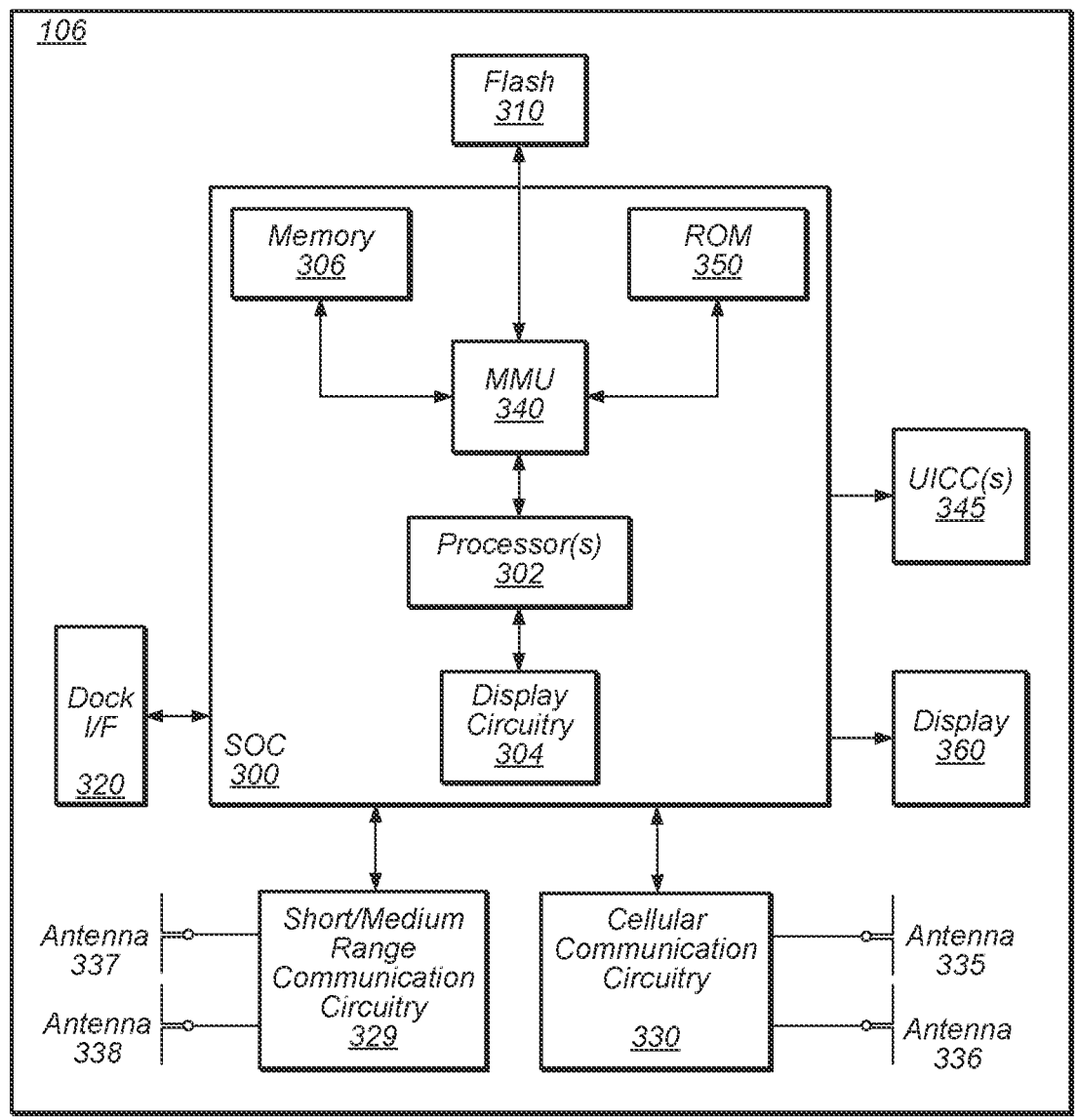
FIG. 3 illustrates an example block diagram of a UE according to some embodiments.

FIG. 3—UE Block Diagram

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND Flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

In some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform any of the various methods as further described herein.

As described herein, the communication device 106 may include hardware and software components for implementing the features described herein for a communication device 106 to communicate slice related information to the network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
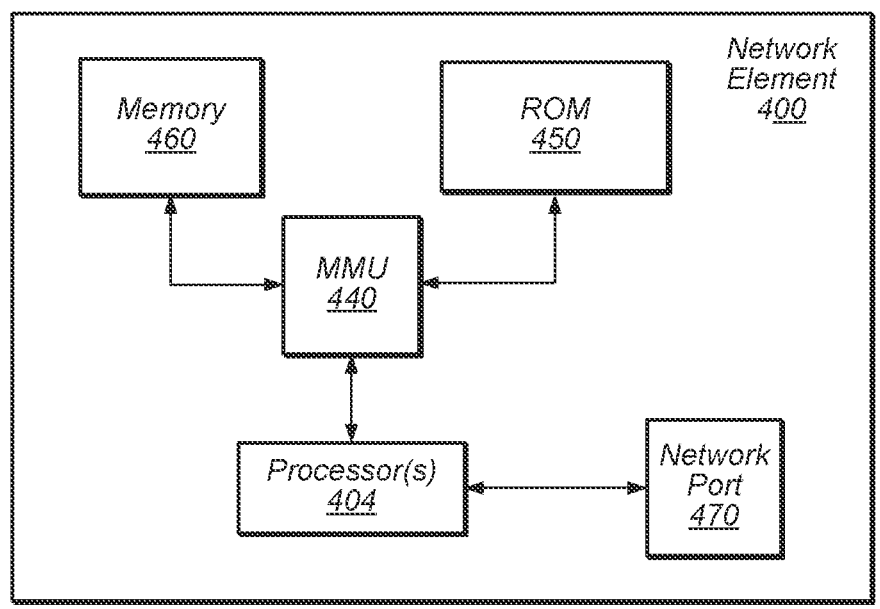
FIG. 4 illustrates an example block diagram of a network element according to some embodiments.

FIG. 4—Example Block Diagram of a Network Element

FIG. 4 illustrates an exemplary block diagram of a network element 400, according to some embodiments. According to some embodiments, the network element 400 may implement one or more logical functions/entities of a cellular core network, such as a mobility management entity (MME), serving gateway (S-GW), etc. As another possibility, the network element 400 may implement a network slice selection function (NSSF) entity. It is noted that the network element 400 of FIG. 4 is merely one example of a possible network element 400. As shown, the core network element 400 may include processor(s) 404 which may execute program instructions for the core network element 400. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The network element 400 may include at least one network port 470. The network port 470 may be configured to couple to one or more base stations and/or other cellular network entities and/or devices. The network element 400 may communicate with base stations (e.g., eNBs) and/or other network entities/devices by means of any of various communication protocols and/or interfaces.

As described further subsequently herein, the network element 400 may include hardware and software components for implementing and/or supporting implementation of features described herein. The processor(s) 404 of the core network element 400 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
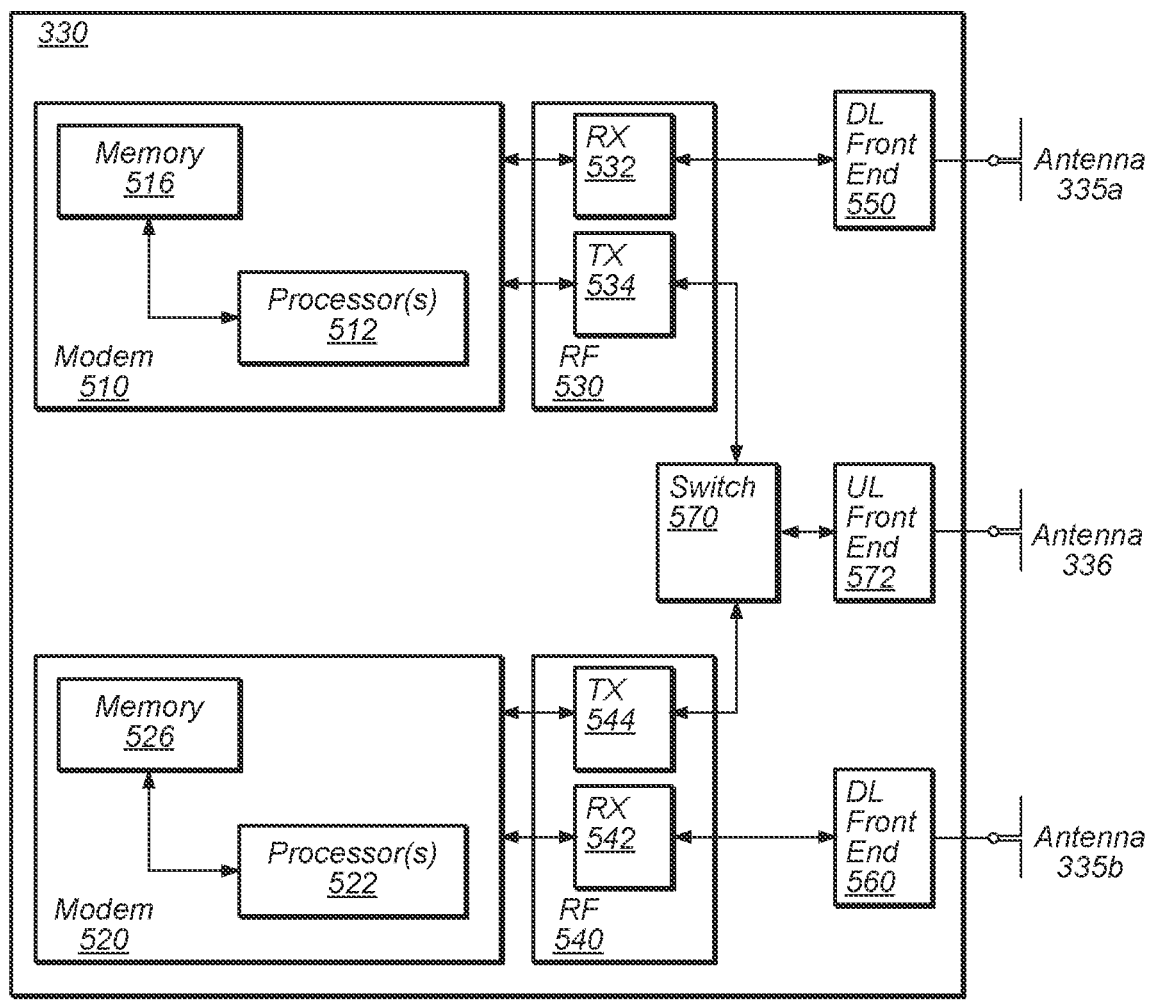
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods a network to notify user equipment device (UE) whether a network slice the UE has requested is subject to a quota as further described herein.

As described herein, the modem 510 may include hardware and software components for implementing any of the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing any of the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
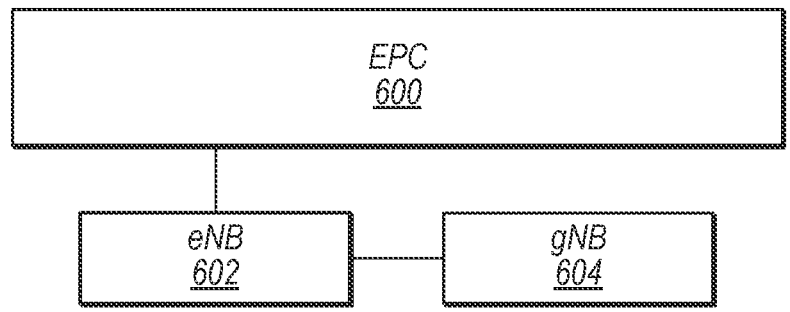
FIG. 6A illustrates an example of connections between an EPC network, an LTE base station (eNB), and a 5G NR base station (gNB)
Figure 6B:
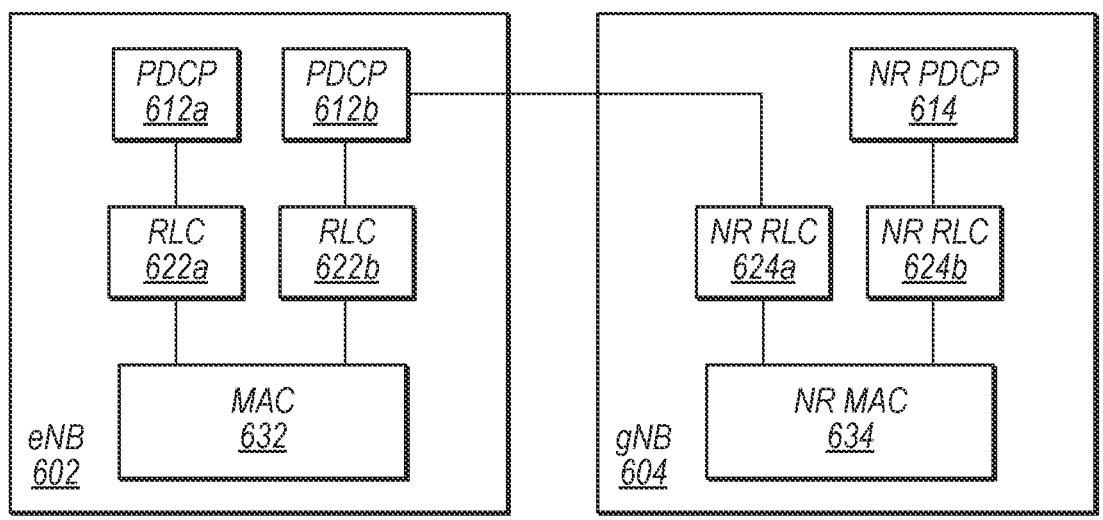
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may operate to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Network Slicing

Network slicing techniques are currently actively under development and may figure prominently in fifth generation ("5G") cellular communication technologies. Network slicing is a concept introduced in 5G that may enable a cellular network operator to create customized networks to provide solutions for different market scenarios that have diverse requirements, e.g., in the areas of functionality, performance and isolation. For example, a cellular network may provide multiple network slices, where each network slice may include a set of network functions (NFs) selected to provide some specific telecommunication service(s) and network capabilities, and the resources to run these NFs. For example, global and regional organizations such as next generation mobile networks (NGMN), third generation partnership project (3GPP), 5G public private partnership (5GPPP), 4G Americas, 5G Forum, International Mobile Telecommunications 2020 (IMT-2020), etc., have documented possible use cases and requirements regarding network slicing.

Among the possible network slicing solutions, Radio Access Network (RAN) slicing and Core Network (CN) slicing are both possible and are currently under study by 3GPP RAN working groups (WGs) and 3GPP service and system aspects (SA) WGs separately. Network slicing is currently specified in 3GPP TS 23.501 section 5.15 and 3GPP TS 24.501 section 4.6. When employing network slicing, the operator can deploy network slices that differ for supported features, or provide exactly the same features, but for different groups of UEs.

The following discussion applies generally to any wireless communication system employing a first cellular network that does support network slicing, and a second cellular network that does not support network slicing. For the sake of convenience, the discussion below refers to the second cellular network that does not support network slicing as a 4G Network and refers to the first cellular network that does support network slicing as a 5G Network. However, the methods described below may be used in any types or any of various generations of networks.

Figure 7:
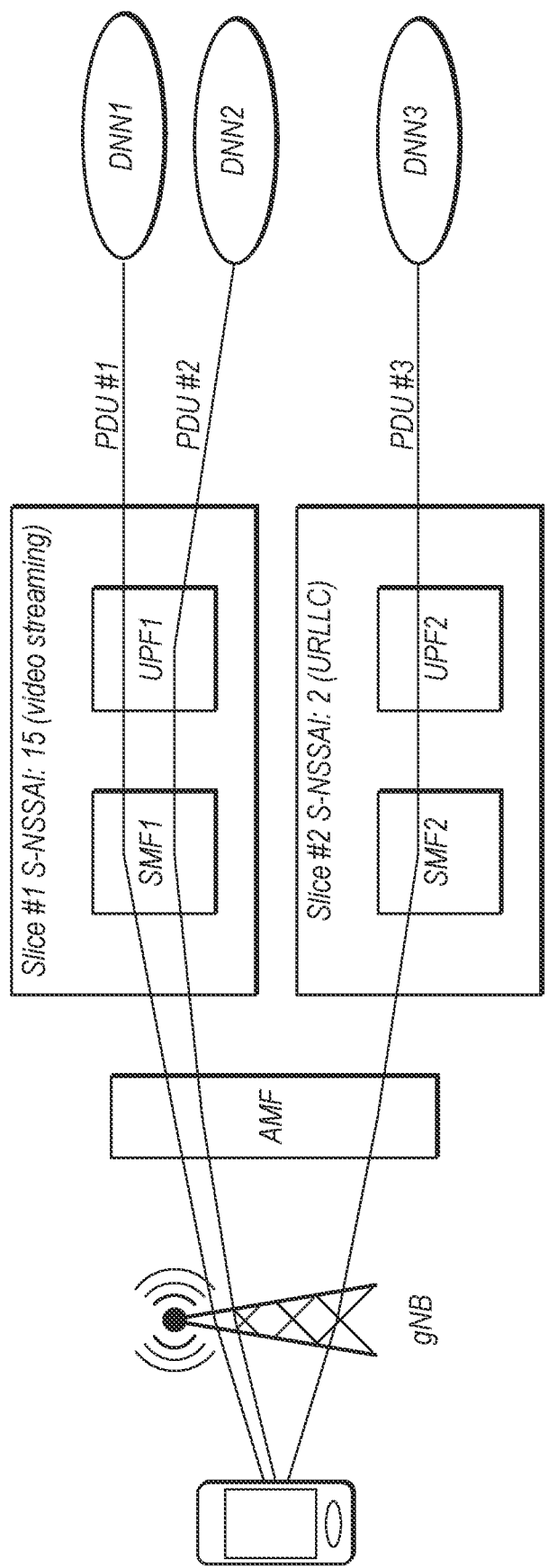
FIG. 7 illustrates a UE conducting multiple PDU sessions with network slices.

FIG. 7 illustrates an example system where a UE is in communication with a cellular network system that implements network slicing (e.g., a 5G Network). As shown, the UE communicates in a wireless manner to a cellular base station. The base station is in turn coupled to the cellular network. As shown, the cellular network may comprise a core access and mobility management function (AMF). The AMF may be coupled to different session management functions (SMF) and user plane functions. As shown, session management function 1 (SMF1) and user plane function 1 (UPF1) may form a first slice (Slice 1) and may have a corresponding first S-NSSAI (single network slice selection assistance information), also referred to as a "Slice ID". In this example, Slice 1 is specified to perform video streaming. Session management function 2 (SMF2) and user plane function 2 (UPF2) may form a second slice (Slice 2) and may have a corresponding second S-NSSAI. In this example. Slice 2 is specified to perform ultra-reliable low-latency communication (URLLC).

As shown in FIG. 7, a single UE can be served by more than one Network Slice simultaneously (e.g., Slice 1 and Slice 2 in FIG. 7). In this example, the AMF serving the UE in this case is common to all Network Slices. FIG. 7 also illustrates that multiple PDU sessions can share the same slice.

Network Slicing and UE Route Selection Policy (URSP) may not be supported in 4G networks. However, during PDN connection establishment in a 4G network, the network may assign an S-NSSAI associated with the 4G PDN connection. The assignment of the S-NSSAI may be based on a combination of session management function (SMF), the packet data network gateway control plane function (PGW-C) address and Access Point Name (APN). The Access Point Name (APN) is essentially a type of gateway or anchoring point to which the UE is attached to gain access to the core network for at least a portion of its data service. The network may then send the assigned S-NSSAI to the UE in an information element (IE). For example, the assigned S-NSSAI may be sent in the Protocol Configuration Options (PCO) information element (IE) or Extended PCO IE in the Activate Default EPS Bearer Context Request message.

This S-NSSAI is not currently used when the UE is operating in a 4G network. However, when the UE moves from a 4G network to a 5G network, the UE may include the one or more S-NSSAIs received from the 4G network as the requested NSSAI in its Registration Request message. The UE may also set the S-NSSAI of the corresponding PDU session to the value previously received in the PCO IE as mentioned above. If the SMF+PGW-C supports more than one S-NSSAI and the APN is valid for more than one S-NSSAI, the SMF+PGW-C should only select an S-NSSAI that is mapped to the subscribed S-NSSAIs of the UE.

After the UE Inter Rat (IRAT) transfer from a 4G network to a 5G network, the PDU session of the 5G network should be linked to the correct S-NSSAI (e.g., if the PDU session is linked to the default slice instead of to the dedicated slice). Currently the network may use the APN to determine the S-NSSAI to be used when the UE transitions from a 4G network to a 5G network.

In some instances, the UE may be configured to provide the 4G network with slice related information, thereby assisting the 4G network in providing the correct slice ID information to the UE while on the 4G network. More specifically, with this improved slice related information from the UE, the 4G network may then be able to include the correct S-NSSAI in the Protocol configuration options IE or Extended protocol configuration options IE in the ACTIVATE DEFAULT EPS BEARER CONTEXT REQUEST message that is sent to the UE. In other words, this may enable the 4G network to provide the UE with the correct slice ID information (the correct S-NSSAIs) while camping on the 4G network.

Thus, when the UE transitions from the 4G network to a 5G network, this may enable the UE and the network to be able to link the 5G PDU sessions to the appropriate (or "correct") slices. Here it is noted that the PDU session may be linked to the correct slice in both the UE and the 5G Network without any signaling between the UE and the 5G Network. Instead, both the UE and the 5G Network depend on and utilize the S-NSSAI previously agreed upon while the UE was camping on the 4G Network. This enables the 5G network to link the 5G PDU session to the correct S-NSSAI, thereby providing an improved user experience on the 5G network. The terms "appropriate slice" or "correct slice" refers to a slice that most appropriately serves the type of application that is currently executing on the UE and is the subject of the current 5G PDU session.

Enhanced Voice Call Establishment with Network Slicing Applications

With the proliferation of mobile gaming and applications that may require URLLC or other diverse requirements, network slicing provides an enhanced experience for users through customized networks which provide specific telecommunication service(s), network capabilities, and resources to run these games or applications more efficiently. However, these experiences may, in some instances, be interrupted or degraded due to a voice call being initiated or received by the wireless device.

For example, if a UE is connected to a new radio (NR) standalone (SA) cell that supports both network slicing and voice over NR (VoNR), it may further establish a sliced PDN connection with the network for use with one or more applications of the UE, according to some embodiments. In other words, the UE may establish a PDN connection that uses one of the slices that its current serving cell (e.g., Cell A) is offering.

Based on previous implementations, if the UE triggers or receives a mobile originated (MO) or mobile terminated (MT) voice call, Cell A may establish the voice call in one of its LTE neighboring cells and trigger an evolved packet system (EPS) fallback to LTE. In some instances, the serving cell's decision to establish the call via an EPS Fallback procedure (rather than establishing it through VoNR) may be because the network thinks that the UE will have better voice quality of service (QOS) on its neighboring LTE cell which has overlapping coverage with it.

However, this EPS fallback to establish the voice call on the neighboring LTE cell may be detrimental to the UE's perceived QoS especially when the UE is using NW slicing. For example, as NW slicing is feature of 5G networks, if an EPS Fallback is triggered, then the ability of the UE to utilize NW slicing will be dropped or lost. Thus, the UE's perceived QoS for data that used to be transported though NW slicing may be substantially degraded. For example, in the scenario where a user is playing a mobile game through a gaming slice, the act of moving its gaming slice that to a non-sliced PDN will considerably lower its perceived QoS.

Additionally, having NR signal quality a little below that of LTE may be offset by the better VoNR related radio resource management (RRM) techniques that are used when a voice call is ongoing on an NR Cell. For example, the NR cell may utilize more efficient semi-persistent scheduling and hybrid automatic repeat request (HARQ) schemes for VoNR as opposed to those of LTE. Accordingly, as the UE simply proceeds according to the network's instructions to trigger an EPS Fallback, the UE loses its active slice and the user experience is degraded. Accordingly, improvements are desired related to enhanced voice call establishment with network slicing applications According to some embodiments, it may be beneficial to collection data for NR cells that support VoNR but also use or support EPS Fallback procedures. Such collection of data may be done through crowdsourcing as well as on devices (e.g., using voice call history, as one example). In some embodiments, the data may be pushed back to the devices via an offline push through over the air (OTA) updates. Alternatively, the data may be pushed back to the devices via an online push in which the UE is aware of its location and queries all cells (with their configurations) that belong to the geographical tile in which the UE is currently located.

According to some embodiments, the UE may then use the pushed data to proactively set or adjust one or more of its UE capabilities such that its connection with slicing enabled does not get interrupted by an EPS fallback procedure. Additionally or alternatively and prior to triggering an EPS Fallback, the NR cell may request (through Inter radio access technology (RAT) Cell Measurement and Reporting Configuration) that the UE perform LTE neighbor cell measurements. Therefore, when the UE receives this measurement request it may, based on the pushed data, proactively prune or adjust such measurements or reporting to ensure that it is not moved or transitioned to LTE via an EPS Fallback procedure. Accordingly, the voice call may then, based on the pruned LTE measurements, be established over NR.

The aforementioned techniques of adjusting UE capabilities and/or LTE cell measurements may be beneficial in reducing the odds of dropping an active slice only because of an incoming/outgoing voice call. Moreover, said techniques may be further beneficial in reducing voice call establishment failure probability. According to some embodiments, these techniques may not be applicable (e.g., may be skipped or disregarded) for Emergency calls since these will likely have higher priority than anything else the UE may be performing. Accordingly, for emergency calls, the UE may follow NW directives for establishing them. Additionally, such implementations may be detected via monitoring tests to verify that UEs change their UE voice over packet switched (VoPS) related capabilities and LTE IRAT Measurement Reporting depending on whether a slice is going to be used, is being used, is not being used, or is not going to be used.

Figure 8:
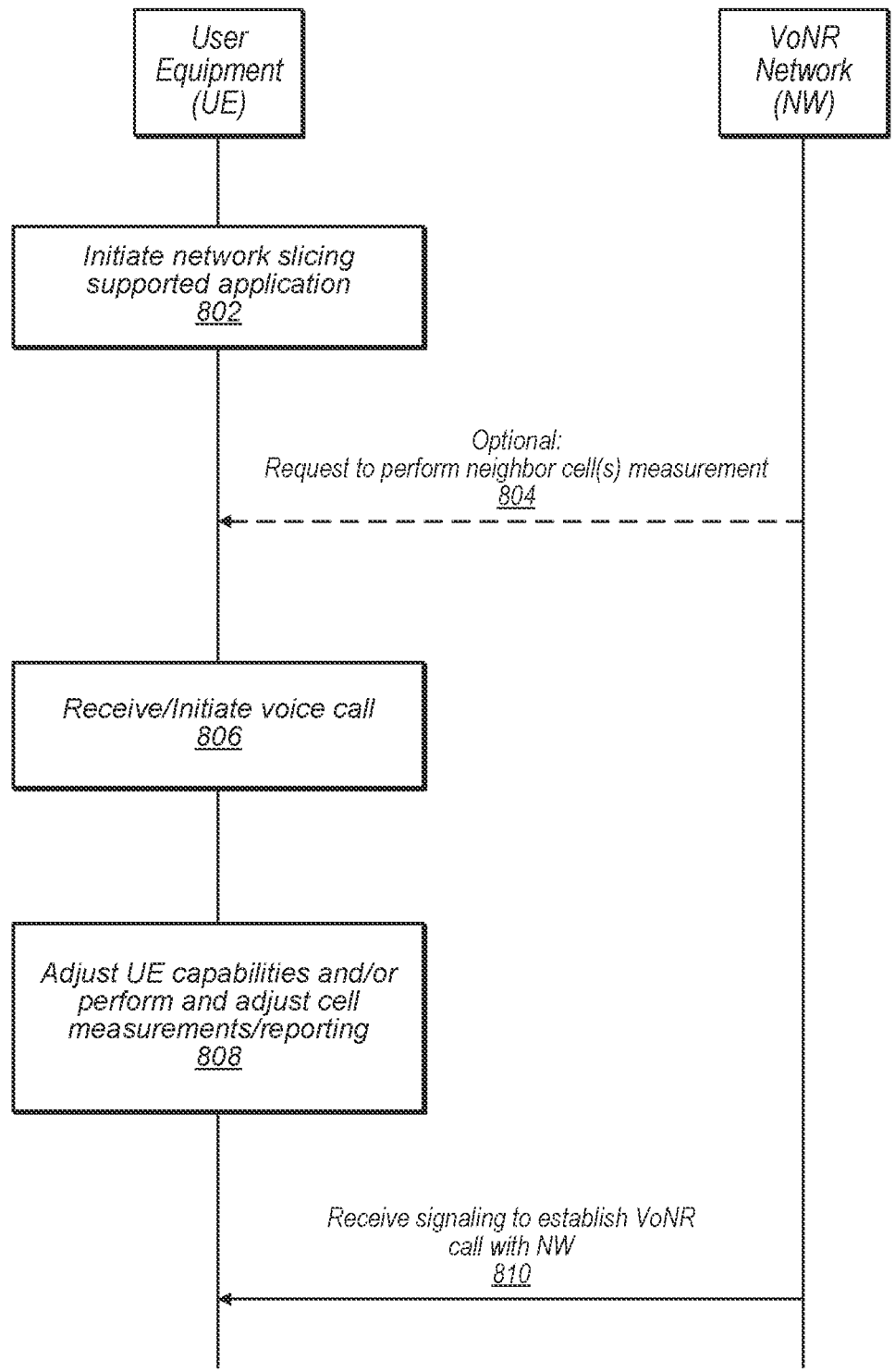
FIG. 8 is a communication flow diagram illustrating an example method for avoiding unwanted or unnecessary EPS fallback procedures, according to some embodiments.

FIG. 8—Example Method for Avoiding Unwanted or Unnecessary EPS Fallback Procedures FIG. 8 is a communication flow diagram illustrating an example method for avoiding unwanted or unnecessary EPS fallback procedures, according to some embodiments. Aspects of the method of FIG. 8 may be implemented by a user equipment (e.g., UE 106) in communication with one or more network nodes or base stations (such as the BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Additionally, one or more processors (or processing elements) of the BS (e.g., processor(s) 402, baseband processor(s), processor(s) associated with communication circuitry, etc., among various possibilities) may cause the BS to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 802, the UE may initiate an application which utilizes a network slice via a packet data network (PDN) connection with a first cellular network, according to some embodiments. The first cellular network may support network slicing and voice over new radio (VoNR) and one or more cells of the first cellular network may support evolved packet system (EPS) fallback procedures associated with a transition to a second cellular network that does not support network slicing. More specifically, the UE may initiate the application which utilizes network slicing via the PDN connection with the first cellular network.

In some embodiments, the application may utilize network slicing in order to perform URLLC. For example, some gaming applications may benefit from very fast connections associated with low pings (e.g., 50 ms or lower times to reach an internet protocol (IP) network host for the gaming application). In some embodiments, the first cellular network may be a fifth generation (5G) network.

According to some embodiments, the UE may determine whether or not one or more cells support EPS fallback procedures, according to some embodiments. For example, the UE may utilize a collection of data for NR cells that support VONR but also use or support EPS Fallback procedures to make such a determination. In some embodiments, the data may have been previously provided to the UE via an offline push through over the air (OTA) updates. Alternatively, the data may have been pushed back to the UE via an online push in which the UE is aware of its location and queries all cells (with their configurations) that belong to the geographical tile in which the UE is currently located. Therefore, cells in the network may indicate, in response to the query, whether or not EPS fallback procedures are supported, according to some embodiments. In some embodiments, an EPS fallback procedure may be associated with a transition to a second cellular network that does not support network slicing. For example, the second cellular network may be a long-term evolution (LTE) network, according to some embodiments.

In 804, the UE may receive, from the first cellular network, a request to perform neighboring cell measurements, according to some embodiments. More specifically, the UE may receive the optional request from the first cellular network (to perform neighboring LTE cell measurements) based on a determination by the network that UE would experience a higher QoS voice call on an LTE cell. In some embodiments, the request may include an inter-radio access technology (IRAT) cell measurement and reporting configuration.

In 806, the UE may receive or initiate a voice call with another UE, according to some embodiments. For example, the UE may initiate a mobile originated (MO) call to another UE or receive a mobile terminated (MT) call from another UE. In some embodiments, the UE may communicate with the network to perform a session initiation protocol (SIP) setup procedure before voice traffic is transmitted between the UE and the other UE.

In 808, the UE may adjust at least one of one or more UE capabilities or cell measurements, according to some embodiments. More specifically, the UE may alter at least one of its capabilities or perform and subsequently alter cell measurements of neighboring LTE cells such that an EPS fallback is deemphasized. According to some embodiments, the UE may perform, in response to the optional measurement request of 804, one or more measurements of one or more cells of the second cellular network and adjust the one or more measurements such that the EPS fallback procedure is deemphasized.

In some embodiments, the UE may further determine, as part of a UE capability sharing procedure between the UE and the first cellular network, whether one or more feature flag equalities are satisfied. Additionally or alternatively, the one or more capabilities may include the one or more feature flag equalities including VoIMS=True, VOLTESupported=True, and VoNrSupported=True. In some embodiments, the UE may adjust one or more capabilities of the UE such that an EPS fallback procedure is deemphasized by switching VOLTESupported=True to VOLTESupported=False. In some instances, the UE may provide, via a user interface (UI) of the UE, a message inquiring whether a user of the UE is willing to lose the network slice in order to establish the call. Additionally, the UE may transmit, to the first cellular network, a response to the message indicating whether the user is willing to lose the network slice in order to establish the call.

In 810, the UE may then receive signaling from the first cellular network in order to establish the voice call as a VoNR call, according to some embodiments. More specifically, the UE may receive signaling from the first cellular network to establish, based at least in part on the one or more adjusted capabilities of the UE, the voice call as a VoNR call via the first cellular network and the network slice may be maintained during the VoNR call. For example, having adjusted its capabilities to indicate that an EPS fallback procedure is deemphasized, the UE may then, as a preferred option, establish the voice call using a VoNR capability of the first cell. In some embodiments, the signaling may include a packet data unit (PDU) session modification command received from the network. Furthermore, the UE may additionally transmit a PDU session modification complete message (in response to the PDU modification command) to the first cellular network before voice communications (e.g., SIP traffic) are exchanged between the UE and the first cellular network. Accordingly, once the PDU session modification communications have been communicated between the network and UE, the VoNR call may be established, according to some embodiments.

Figure 9A:
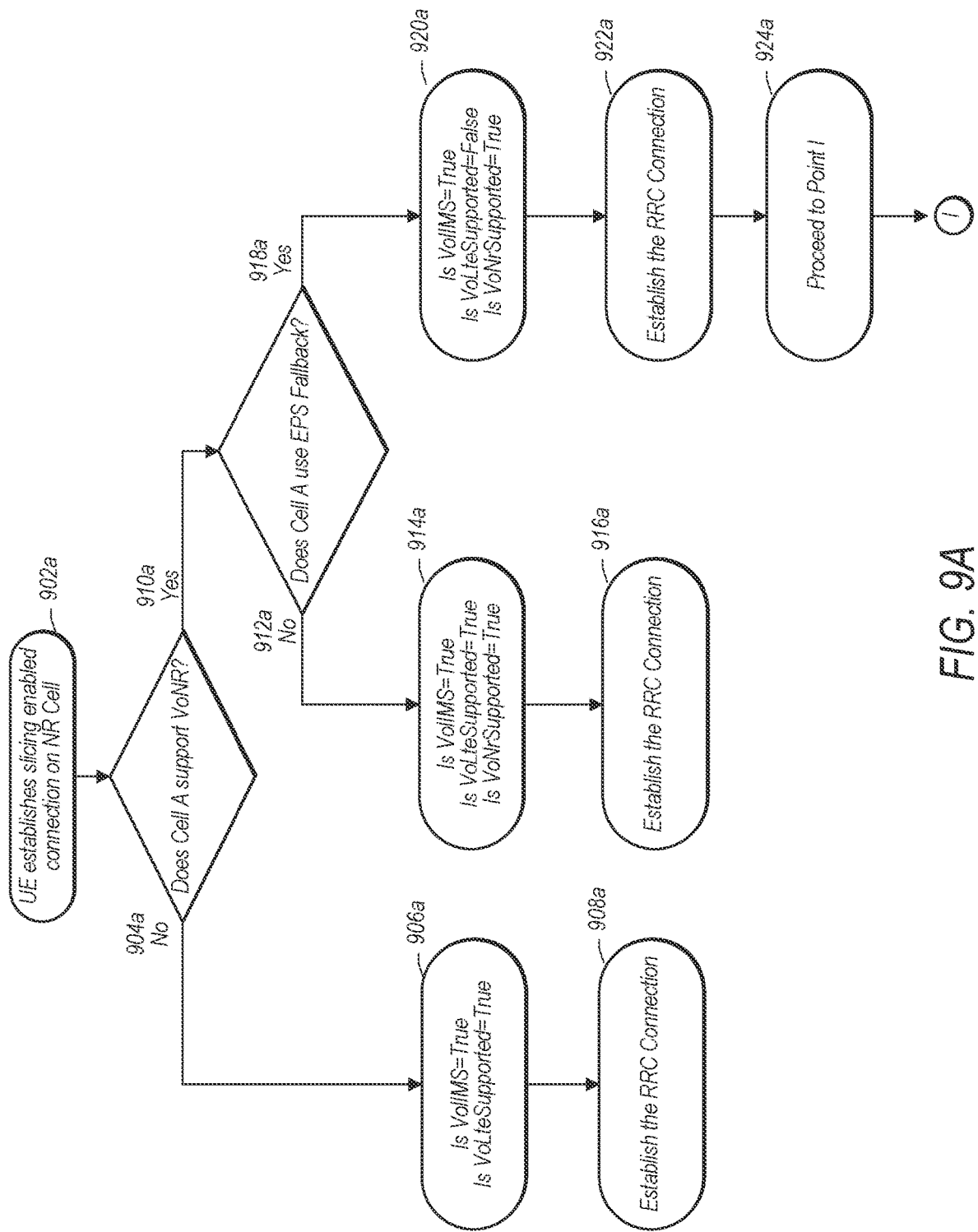
FIGS. 9a and 9b are parts of a flowchart diagram illustrating example aspects of a method for avoiding unwanted or necessary EPS fallback procedures, according to some embodiments.
Figure 9B:
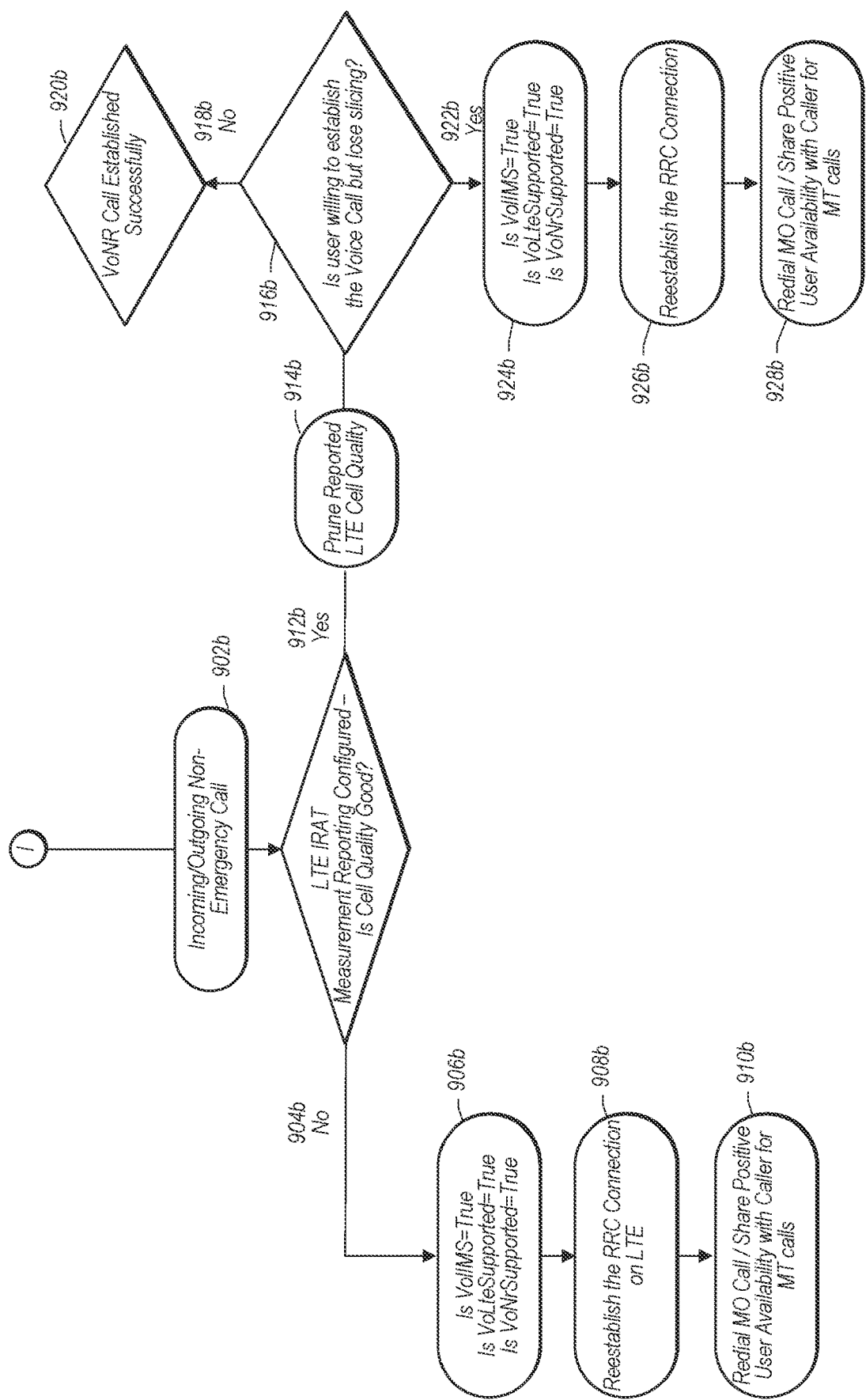

FIGS. 9A and 9B—Flowchart Diagrams: Method for Avoiding Unwanted EPS Fallback Procedures FIGS. 9A and 9B are parts of a flowchart diagram illustrating example aspects of a method for avoiding unwanted or necessary EPS fallback procedures, according to some embodiments. More specifically, FIGS. 9A and 9B illustrate aspects related to the method of FIG. 8, according to some embodiments.

Aspects of the method of FIGS. 9A and 9B may be implemented by a user equipment (e.g., UE 106) in communication with one or more network nodes or base stations (such as the BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Additionally, one or more processors (or processing elements) of the BS (e.g., processor(s) 402, baseband processor(s), processor(s) associated with communication circuitry, etc., among various possibilities) may cause the BS to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 902a, the UE may establish a slicing enabled connection (e.g., a PDN connection) on a NR cell (e.g., Cell A), according to some embodiments. In some embodiments, establishment of a slicing enabled connection may include requesting and subsequently receiving non-access stratum (NAS) signaling a network in order to establish said connection. For example, the signaling between the UE and first cellular network may include PDU session establishment request and accept signaling. Additionally or alternatively, the UE may receive a PDU session modification command from the network and transmit a PDU session modification complete message (in response to the PDU modification command) to the first cellular network before the slicing enabled connection is established. Accordingly, once the PDU session establishment and modification communications have been communicated between the network and UE, the PDN connection (e.g., slicing enabled connection) between the UE and the first cellular network may be established, according to some embodiments.

As one alternative, in 904a Cell A may not support VONR voice calls and accordingly the UE may proceed to 906a to determine if the Cell A supports VoIMS and/or VOLTE. In other words, the UE may confirm or verify that VoIMS=True and VOLTESupported=True. Once the UE has determined that these criteria are true, it may proceed to 908a and establish the radio resource control (RRC) connection with Cell A.

However, if Cell A does not support VONR as in 910a, the UE may proceed to determine whether or not Cell A supports and/or uses EPS fallback procedures. For example, if Cell A does not use or support EPS fallback procedures, the UE may continue to 914*a* to determine if the Cell A supports VoIMS, VOLTE, and/or VoNR. In other words, the UE may confirm or verify that VoIMS=True, VOLTESupported=True, and/or VoNrSupported=True. Once the UE has determined that these criteria are true, it may proceed to 916*a* and establish the RRC connection with Cell A. According to some embodiments, VoIMS=True, VOLTESupported=True, and VoNrSupported=True may be feature flags controlled via UE capability sharing procedures between the UE and the network.

Alternatively, if Cell A does support VONR as in 918*a*, the UE may proceed to adjust one or more of its UE capabilities. For example, the UE may adjust or alter one of its capabilities such that VoIMS=True, VOLTESupported=False, and VoNrSupported=True. In other words, the UE may alter its capability indication such that it indicates that it does not support voice calls on LTE. Accordingly, once the UE has adjusted the appropriate UE capability indication, it may proceed to 922*a* to establish the RRC connection with Cell A. Furthermore, having established the RRC connection with Cell A, the UE may continue to Point I of FIG. 9B.

FIG. 9B illustrates a continuation of the flowchart of FIG. 9A. For example, starting at Point I of FIG. 9A (continued from Point I of FIG. 9A), the UE may proceed to 902*b* in which it receives or initiates a non-emergency voice call. Accordingly, the UE may receive, via a request from the NR cell (e.g., Cell A) an inter-radio access technology (IRAT) Cell Measurement and Reporting Configuration. In some embodiments, this request may indicate for the UE to perform LTE neighbor cell measurements.

The UE may then, if the LTE neighbor cell measurements correspond to a cell that does not have good QoS (e.g., is below a threshold value), proceed to 906*b* to determine whether or not the LTE Cell supports VoIMS, VOLTE, and/or VoNR. In other words, the UE may confirm or verify that VoIMS=True, VOLTESupported=True, and/or VoNrSupported=True. Once the UE has determined that these criteria are true, it may proceed to 908*b* and establish the radio resource control (RRC) connection with the LTE cell, according to some embodiments. Additionally at 910*b*, for MO calls, the UE may redial the call if necessary and/or provide or share positive user availability with a caller for a MT call.

Alternatively, as in 912*b*, if the LTE neighbor cell measurements correspond to a cell that does have good QoS (e.g., is above a threshold value), the UE may proceed to 914*b* to prune, adjust, or alter the measurements taken on the LTE cell. For example, the UE may adjust the measurements of one or more LTE neighboring cells to be below a threshold value and further correspond with a non-ideal QoS, according to some embodiments. Additionally or alternatively, the UE may alter or adjust the measurements that it reports to the network (e.g., Cell A).

In some embodiments and at 916*b*, a user may be willing to lose the benefits of slicing so as to establish the voice call. For example, the user may receive a message from a CallKit user interface (CallKit UI) asking the user whether they are willing to drop or lose slicing benefits in order to establish the voice call. If the user of the UE is not willing to lose slicing benefits in order to establish the voice call as in 918*b*, the UE may proceed to 920*b* in which the VoNR call is successfully established, according to some embodiments.

Alternatively, if the user of the UE is willing to lose slicing benefits in order to establish the voice call as in 922*b*, the network may not establish the call via VoNR and the UE may proceed from 916*b* to 924*b* to determine whether the LTE Cell supports VoIMS, VOLTE, and/or VoNR. In other words, the UE may confirm or verify that VoIMS=True, VOLTESupported=True, and/or VoNrSupported=True. Once the UE has determined that these criteria are true, it may proceed to 926*b* and re-establish the RRC connection with the LTE cell, according to some embodiments. Additionally at 928*b*, for MO calls, the UE may redial the call if necessary and/or provide or share positive user availability with a caller for a MT call.

Figure 10:
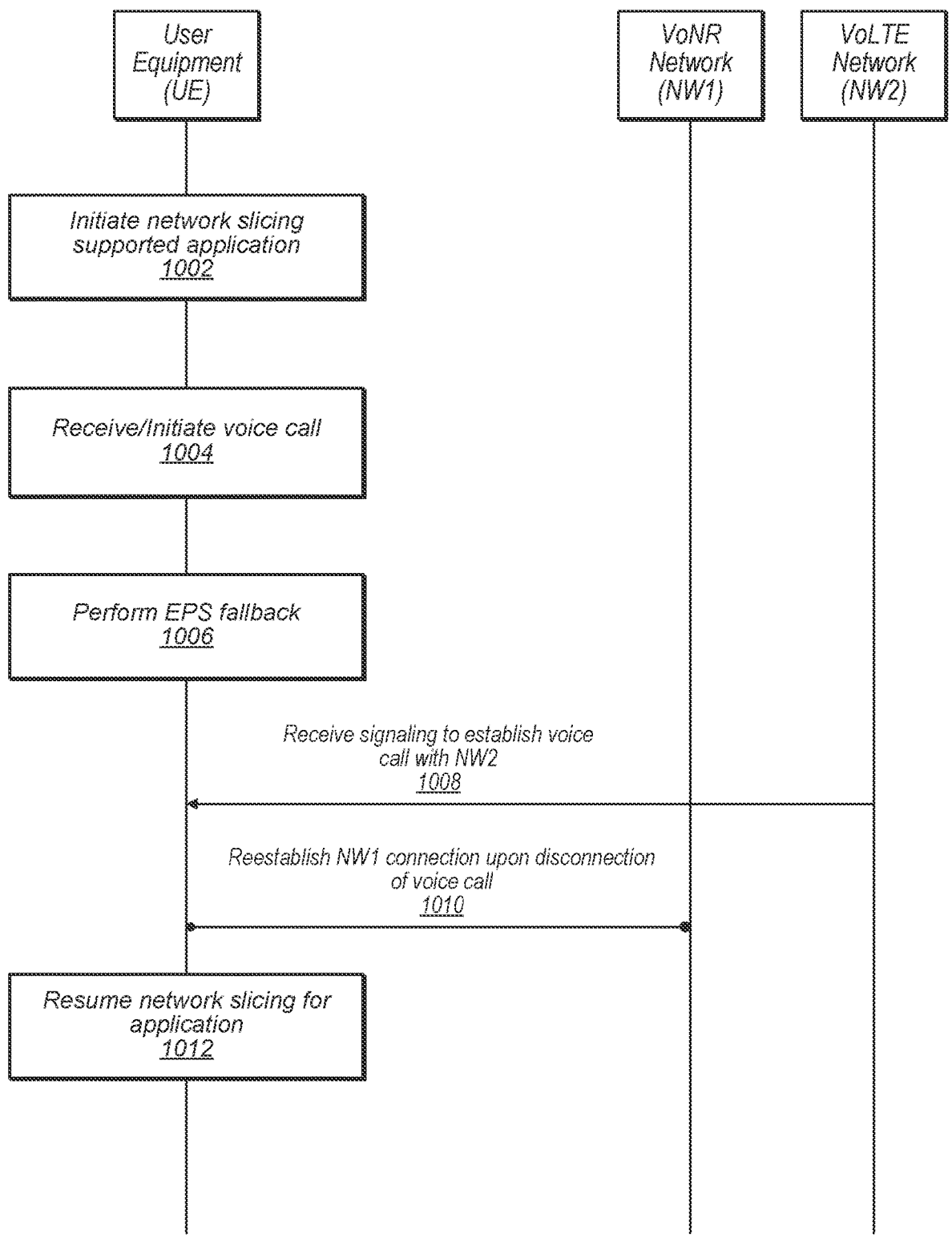
FIG. 10 is a communication flow diagram illustrating an example method for a re-transitioning back to a slicing supported network after performing an EPS fallback procedure, according to some embodiments.

FIG. 10—Method for Efficient Re-Transition to NR after EPS Fallback

FIG. 10 is a communication flow diagram illustrating an example method for a re-transitioning back to a slicing supported network after performing an EPS fallback procedure, according to some embodiments.

Aspects of the method of FIG. 10 may be implemented by a user equipment (e.g., UE 106) in communication with one or more network nodes or base stations (such as the BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Additionally, one or more processors (or processing elements) of the BS (e.g., processor(s) 402, baseband processor(s), processor(s) associated with communication circuitry, etc., among various possibilities) may cause the BS to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

At 1002, the UE may initiate an application on a user equipment (UE), according to some embodiments. More specifically, the UE may initiate an application which utilizes a network slice via a packet data network (PDN) connection with a first cellular network. The first cellular network may support network slicing and voice over new radio (VONR) and one or more cells of the first cellular network may support evolved packet system (EPS) fallback procedures associated with a transition to a second cellular network that does not support network slicing. In other words, the UE may initiate the application which utilizes network slicing via the PDN connection with the first cellular network. In some embodiments, the application may utilize network slicing in order to perform URLLC. For example, some gaming applications may benefit from very fast connections associated with low pings. In some embodiments, the first cellular network may be a fifth generation (5G) network and the second cellular network may be a fourth generation (4G) network (e.g., LTE).

According to some embodiments, the application may be being executed in a foreground of the UE. Additionally, VoNR may be disabled on the UE based at least in part on the UE being in a do-not-disturb (DND) mode, according to some embodiments.

In some embodiments, the UE may determine whether one or more cells support EPS fallback procedures, according to some embodiments. For example, the UE may utilize a collection of data for NR cells that support VONR but also use or support EPS Fallback procedures to make such a determination. In some embodiments, the data may have been previously provided to the UE via an offline push through OTA updates or via an online push in which the UE is aware of its location and queries one or more cells (with their configurations) that belong to the geographical tile in which the UE is currently located. Furthermore, the cells in the network may indicate to the UE, in response to the queries, whether or not they support EPS fallback procedures, according to some embodiments.

At 1004, the UE may receive or initiate a voice call, according to some embodiments. For example, the UE may initiate a MO call to another UE or receive a MT call from another UE. In some embodiments, the UE may communicate with the network to perform a SIP setup procedure before voice traffic is transmitted between the UE and the other UE.

In some embodiments, the voice call may be a mobile terminated (MT) call and the UE may transmit, in response to receiving the MT call and based at least in part on the UE being in a DND mode, a reject message to the network. Additionally, the UE may be able to enable VoNR on the UE, according to some embodiments.

At 1006, the UE may perform an EPS fallback procedure, according to some embodiments. In other words, the UE may transition from the first cellular network (e.g., 5G) corresponding to a carrier that does support VONR and network slicing to a second cellular network (e.g., LTE) that does not support network slicing or VoNR. Additionally or alternatively, the UE may perform an EPS fallback procedure in response to VoNR not being enabled or supported at the UE. For example, VoNR may be disabled on the UE due to VoNR not being enabled by the carrier or if the user of the UE disabled VoNR.

At 1008, the UE may establish the voice call with a second network (e.g., NW2). More specifically, the UE may receive signaling from the second cellular network in order to establish the voice call as a VOLTE call, according to some embodiments. For example, having performed the EPS fallback procedure in 1006, the UE may then establish the voice call using a VOLTE capability of the second cellular network. In some embodiments, the signaling may include SIP signaling for setup of the VOLTE call as well as RRC connection reconfiguration signaling between the UE and the second cellular network. Accordingly, once the appropriate SIP and RRC communications have been communicated between the network and UE, the VOLTE call may be established. In other words, at 1008, the UE may receive signaling from the second cellular network to establish the voice call via the second cellular network. Additionally, the network slice may not be not utilized via the PDN connection with the first cellular network during the voice call, according to some embodiments.

At 1010, the UE may reestablish a connection with the first cellular network (e.g., NW1), according to some embodiments. More specifically, upon disconnection or termination of the voice call on NW2, the UE may reestablish its connection with the NR network (e.g., NW1) which supports NW slicing. For example, the UE may then request and subsequently receive non-access stratum (NAS) signaling from the first cellular network in order to reestablish or establish a new PDU session with the first cellular network. The signaling between the UE and first cellular network may include PDU session establishment request and accept signaling, according to some embodiments. Additionally or alternatively, the UE may receive a PDU session modification command and transmit a PDU session modification complete message (in response to the PDU modification command) to the first cellular network before network slicing may be resumed. Accordingly, once the PDU session modification communications have been communicated between the network and UE, the PDN connection between the UE and the first cellular network may be reestablished, according to some embodiments. In other words, in 1010 the UE may retransition, based at least in part on the voice call being disconnected from the second cellular network and the application remaining initiated, to the first cellular network. Furthermore, the retransition to the first cellular network may be triggered based on VoNR being enabled on the UE and the application running in a foreground of the UE, according to some embodiments.

At 1012, the UE may resume utilizing network slicing for the application, according to some embodiments. In other words, the UE may resume utilization of the network slice via the PDN connection with the first cellular network FIGS. 11 and 12—Flowchart Diagrams: Methods for Efficient Re-Transition to NR after EPS Fallback As a promising way to increase the overall user experience, the number of evolving 5G use cases involving network slicing with dedicated slices is increasing. For example, users may use slicing subscriptions so as to have better user experiences while using applications that can transfer data over dedicated slices (e.g., gaming applications, as one example). However, in some instances, applications running on UEs and further using dedicated slices may encounter MT/MO calls being triggered at the UE.

As VoNR is not pre-requisite for network slicing to work, carriers may be able to enable dedicated slices without enabling VoNR. Accordingly, while the user is using an application that uses network slicing, if VoNR is not enabled by the carrier or if the user has switched off VoNR, the device may fall back to LTE. Moreover, the UE may remain on LTE even after the MO or MT call ends. Therefore, even though the MO/MT voice call has been disconnected, the user may not be able to utilize network slicing for applications that may be executing or running in the foreground of the UE. Accordingly, it may be beneficial to describe methods for efficient re-transitioning of UEs to network slicing supported cells (e.g., NR cells) after performing an EPS fallback procedure.

For example, it may be beneficial to enable VoNR when a network slicing supporting application is operating in the foreground of the UE. Accordingly, if the UE falls back to LTE due to receiving or initiating a voice call and if the network slicing application is in foreground, after the voice call ends, a trigger event could force the UE to return to NR irrespective of other implementations of triggers.

Figure 11:
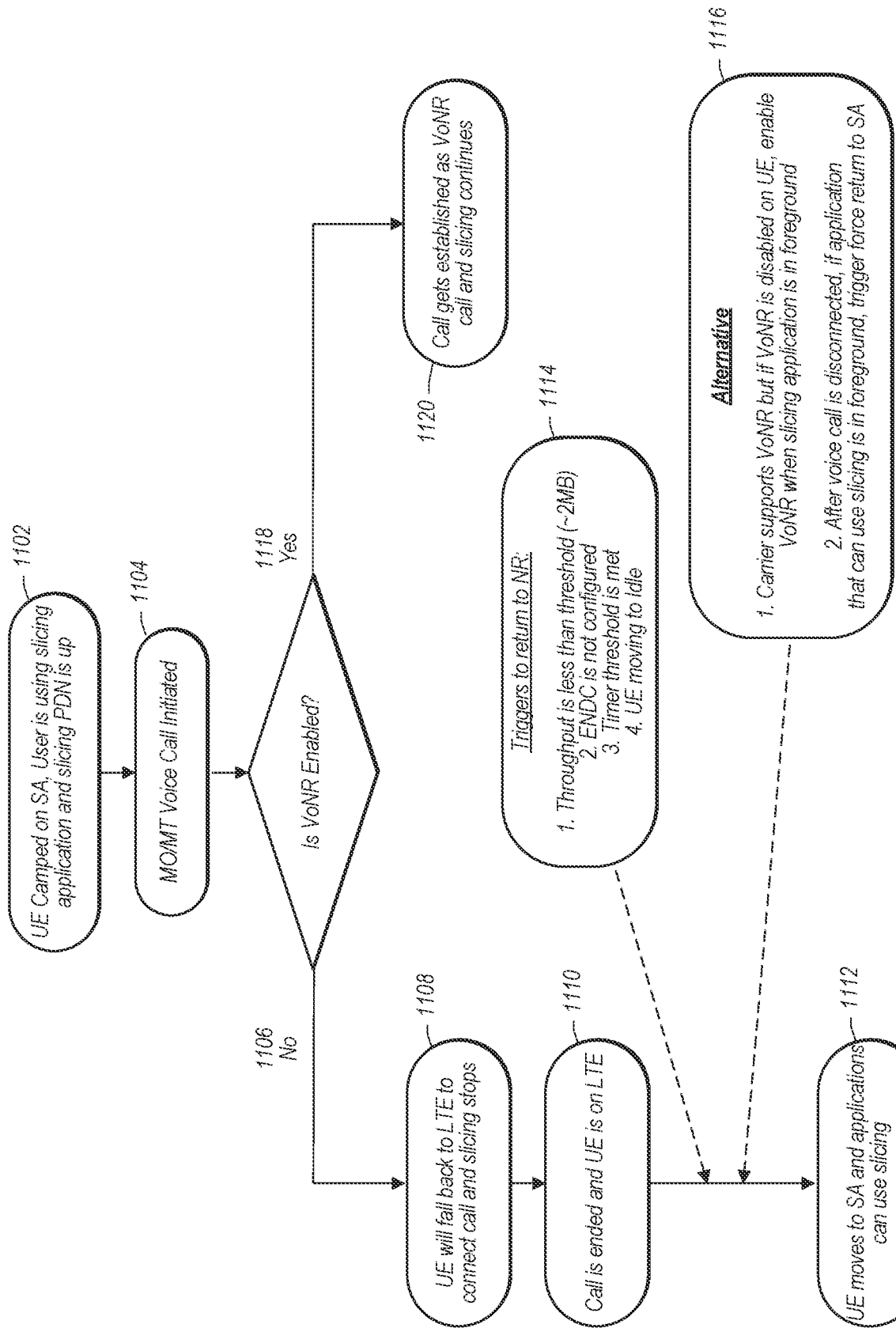
FIGS. 11 and 12 are flowchart diagrams illustrating example aspects of methods for re-transitioning back to a slicing supported network after performing an EPS fallback procedure, according to some embodiments.
Figure 12:
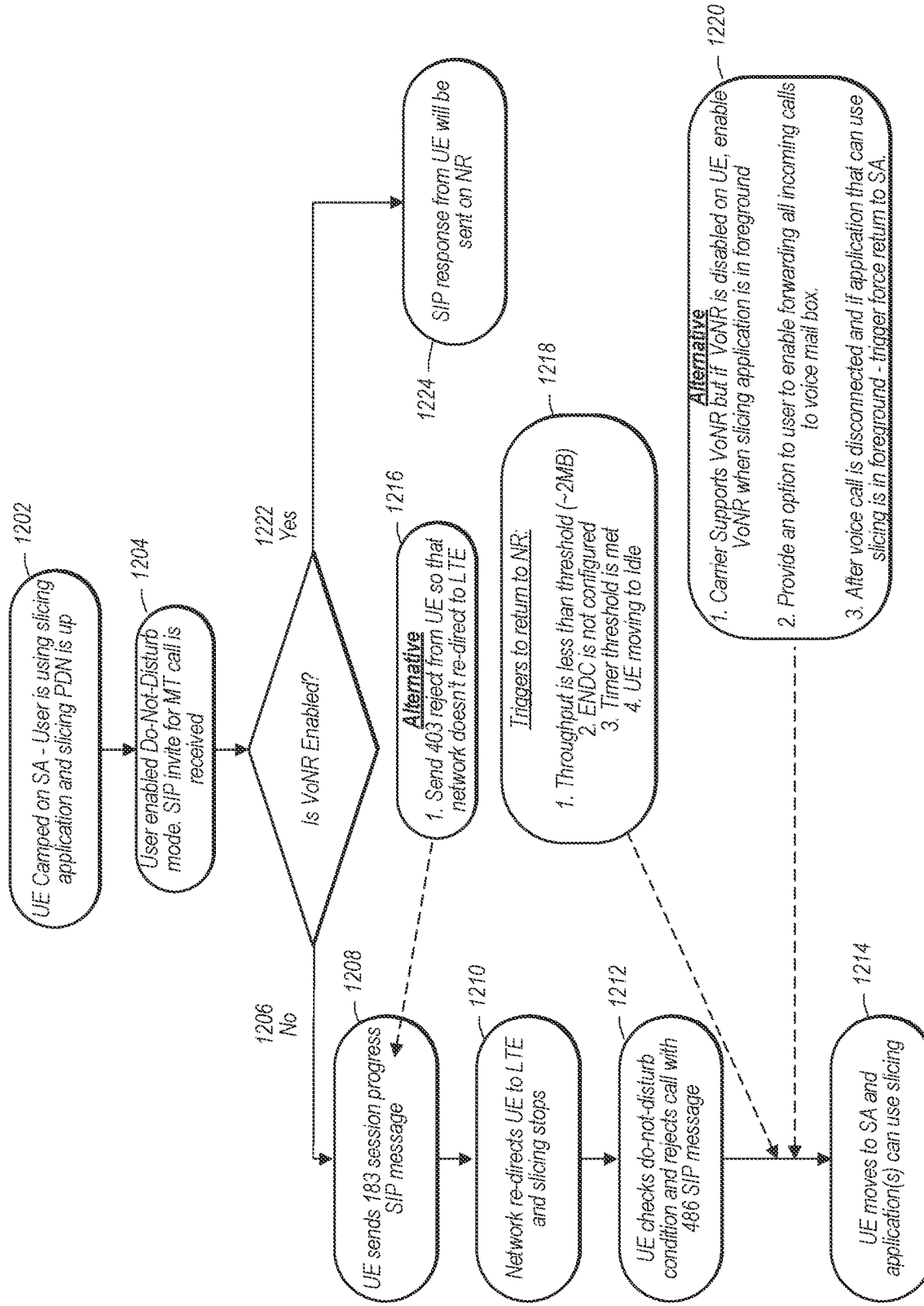

Aspects of the methods of FIGS. 11-12 may be implemented by a user equipment (e.g., UE 106) in communication with one or more network nodes or base stations (such as the BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Additionally, one or more processors (or processing elements) of the BS (e.g., processor(s) 402, baseband processor(s), processor(s) associated with communication circuitry, etc., among various possibilities) may cause the BS to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

FIGS. 11 and 12 are flowchart diagrams illustrating example aspects of methods for efficient re-transition to NR after EPS fallback, according to some embodiments. More specifically, FIG. 11 is a flowchart diagram illustrating an efficient re-transition back to an NR cell after having performed an EPS fallback procedure in response to a MT/MO voice call being triggered, according to some embodiments.

For example, at 1102, the UE may be camped on a cell in SA mode and may be further utilizing network slicing via a slicing PDN, according to some embodiments. Furthermore, at 1104, the UE may receive (e.g., MT) or initiate (MO) a voice call. If VONR is enabled as in 1118, the UE may proceed to 1120 in which the voice call is established as a VoNR call and the application running on the UE may continue to utilize network slicing via the slicing PDN, according to some embodiments.

However, if VoNR is not enabled as in 1106, the UE may proceed to 1108 in which the UE may perform an EPS fallback procedure in order to establish the voice call over LTE, according to some embodiments. Additionally, as LTE does not support network slicing, the application may discontinue its utilization of network slicing via the slicing PDN while connected to the LTE network. Furthermore, once the call is ended or disconnected as in 1110, the UE may remain on the LTE call until an event or trigger occurs or is received in order to retransition the UE back to a NR cell.

In some current or previous implementations, there may have been multiple options for triggering a UE to return to an NR cell after completion of a voice call on LTE. For example and as illustrated in 1114, the throughput being less than a threshold (e.g., 2 megabytes (MB), Evolved Universal Terrestrial Radio Access (E-UTRA) NR Dual Connectivity (ENDC) not being configured, a timer threshold being met, or if the UE moving to an Idle mode may all be triggers associated with the UE re-transitioning to an NR cell from an LTE cell. Accordingly, if one of these trigger conditions is satisfied, the UE may continue to 1112 in which it moves back to the SA mode on an NR cell and its network slicing supported application(s) may resume utilization of network slicing via the slicing PDN.

However, as one alternative described in 1116, if the carrier supports VONR but VoNR is disabled on the UE, it may be possible to enable VoNR when the slicing application is in the foreground, according to some embodiments. For example, an application may be considered to be operating in the foreground of the UE if it has a visible activity, if activity is started or paused, if it has a foreground service, and/or if another foreground application is connected to the application (e.g., either by binding to one of its services or by making use of one of its content providers). However, if none of these conditions are true, the application may be considered to be operating in the background of the UE. Accordingly, if at least one of these conditions are true or satisfied, they may be used as a trigger (e.g., at a time corresponding to one or more of the aforementioned conditions being satisfied) to allow the UE to proceed to 1112 in which the UE moves back to the SA mode (e.g., transitions back to the NR cell) and the application running on the UE may resume utilization of network slicing via the slicing PDN, according to some embodiments.

Therefore, by enabling VoNR and triggering a forced return to SA mode when the slicing application is in the foreground once the voice call is disconnected on LTE, the UE may remain on LTE only as long as necessary to complete the voice call, according to some embodiments. Accordingly, this enhanced method for re-transitioning back to NR after an EPS fallback procedure is performed may minimize time spent on a network that does not support network slicing and therefore provide an efficient means for returning to a network slicing supported network which ultimately corresponds to an improved user experience.

FIG. 12 is a flowchart diagram illustrating example aspects of an efficient re-transition back to an NR cell after having performed an EPS fallback procedure in response to the UE being in a do-not-disturb (DND) mode, according to some embodiments. A DND mode may correspond to a mode in which MT calls may be redirected to voicemail in order to not disturb the user.

For example, in 1202, a UE may be camped on a cell in SA mode and executing an application on a dedicated slice (e.g., via utilization of a slicing PDN), according to some embodiments. Furthermore, in 1204, the user may have DND enabled and a MT call may be received (e.g., the UE may receive a session initiation protocol (SIP) invite message for the MT call). In this scenario, if VoNR is enabled as in 1222, the UE may further transmit in 1224 a SIP response to the network on the NR cell.

Alternatively in 1206, if VoNR is not enabled or supported by the carrier and if the MT call SIP invite message is received, the UE may reply with a "183 session progress" SIP message before checking whether do not disturb is enabled or not, according to some embodiments.

In 1208, the UE may send a 183 session progress SIP message to the network, according to some embodiments. For example, as VoNR is not enabled, the UE may indicate, via the 183 session progress SIP message, to the network that VoNR is not enabled.

Alternatively and as a proactive measure illustrated by 1216, the UE may send a 403 rejection message to the network to indicate that the network should not re-direct UE to LTE, according to some embodiments. For example, alternative to sending the 183 session progress SIP message to the network in 1208, the UE may instead transmit a 403 reject message to the network in order to avoid an EPS fallback procedure to LTE, according to some embodiments. For example, the 403 reject message may indicate that an EPS fallback procedure is forbidden, according to some embodiments.

In the scenario in which the UE does not send the 403 reject message, the network may in 1210 start the 5G to LTE transition or re-direction (e.g., through an EPS fallback procedure) even though DND is enabled and the UE is not interested in taking the call (e.g., via user indicated preference). Furthermore, in 1212, the UE may check its DND status (e.g., whether or not DND is enabled and/or rules associated with said status) and reject the call with a 486 SIP (e.g., "Call Rejected By User") message and potentially re-direct the call to voicemail, according to some embodiments. In other words, when in DND mode and when the slicing application is in the foreground, the UE may forward received calls to a voice mail box.

In the scenario in which the network does re-direct the UE to LTE as in 1210, there may be multiple options for triggering a UE to return to an NR cell after transitioning to LTE and rejecting the voice call. For example and as illustrated in 1218, the throughput being less than a threshold (e.g., approximately 2 MB, ENDC not being configured, a timer threshold being met, or if the UE moving to an Idle mode may all be triggers associated with the UE re-transitioning to an NR cell from an LTE cell. Accordingly, if one of these trigger conditions is satisfied, the UE may continue to 1214 in which it moves back to the SA mode on an NR cell and its network slicing supported application(s) may resume utilization of network slicing via the slicing PDN.

Accordingly, if at least one of these conditions are true or satisfied, they may be used as a trigger (e.g., at a time corresponding to one or more of the aforementioned conditions being satisfied) to allow the UE to proceed to 1214 in which the UE moves back to the SA mode (e.g., transitions back to the NR cell) and the application running on the UE may resume utilization of network slicing via the slicing PDN, according to some embodiments.

However, in some embodiments in which the UE falls back to LTE, it may not perform a fast or efficient return to NR because the call was not connected (e.g., due to DND being enabled) and the network may not quickly redirect the UE to SA. Therefore, the UE may be stuck in LTE for that RRC connection, according to some embodiments. Accordingly, it may be beneficial to describe methods for more efficiently re-transitioning the UE back to NR when DND is enabled, a MT voice call is received, and an EPS fallback to LTE is performed.

For example and as shown in 1220, if the carrier supports VONR but VONR is disabled on the UE, it may still be possible to enable VoNR when the slicing application is in foreground, according to some embodiments. Furthermore, the UE may be provided an option to enable forwarding of all incoming calls to a voicemail inbox. Accordingly, after the voice call is disconnected and if the slicing application is still in the foreground, this may trigger a forced return to SA mode, according to some embodiments. Therefore, when the UE falls back to LTE due to a voice call being received and after the voice call ends (e.g., is disconnected), a triggered force return to NR irrespective of previous implementations or criteria may be possible if the slicing application is being executed in the foreground of the UE.

Therefore, by enabling VoNR and triggering a forced return to SA mode when the slicing application is in the foreground and the voice call(s) have been rejected and forwarded to voicemail, the UE may remain on LTE only as long as necessary to complete said rejection and forwarding, according to some embodiments. Accordingly, this enhanced method for re-transitioning back to NR after an EPS fallback procedure and call rejection/voicemail forwarding is performed may minimize time spent on a network that does not support network slicing. Therefore, this may provide an efficient means for returning to a network slicing supported network which ultimately corresponds to an improved user experience.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
  initiating an application on a user equipment (UE), wherein the application utilizes a network slice via a packet data network (PDN) connection with a first cellular network, wherein the first cellular network supports network slicing and voice over new radio (VoNR), and wherein one or more cells of the first cellular network support evolved packet system (EPS) fallback procedures;
  receiving or initiating a voice call with another UE;
  adjusting one or more capabilities of the UE such that an EPS fallback procedure is deemphasized, wherein the EPS fallback procedure is associated with a transition to a second cellular network that does not support network slicing; and receiving signaling from the first cellular network to establish, based at least in part on the one or more capabilities of the UE that have been adjusted, the voice call as a VoNR call via the first cellular network, wherein the network slice is maintained during the VoNR call.

2. The method of claim 1, further comprising:
determining, as part of a UE capability sharing procedure between the UE and the first cellular network, whether one or more feature flag equalities are satisfied, wherein the one or more capabilities comprise the one or more feature flag equalities including VoIMS=True, VOLTESupported=True, and VoNrSupported=True.

3. The method of claim 2, wherein adjusting the one or more capabilities of the UE such that the EPS fallback procedure is deemphasized comprises switching VOLTESupported=True to VOLTESupported=False.

4. The method of claim 1, further comprising:
providing, via a user interface (UI) of the UE, a message inquiring whether a user of the UE is willing to lose the network slice in order to establish the call.

5. The method of claim 4, further comprising:
transmitting, to the first cellular network, a response to the message indicating whether the user is willing to lose the network slice in order to establish the call.

6. The method of claim 1, further comprising:
receiving, from the first cellular network, a message comprising an inter-radio access technology (IRAT) cell measurement and reporting configuration.

7. The method of claim 6, wherein the message comprises a request for the UE to perform measurements of one or more neighboring cells of the second cellular network.

8. The method of claim 7, further comprising:
performing, in response to the request, one or more measurements of the one or more neighboring cells of the second cellular network; and
adjusting the one or more measurements such that the EPS fallback procedure is deemphasized.

9. An apparatus, comprising:
at least one processor configured to cause a user equipment (UE) to:
initiate an application on the UE, wherein the application utilizes a network slice via a packet data network (PDN) connection with a first cellular network, wherein the first cellular network supports network slicing and voice over new radio (VoNR), and wherein one or more cells of the first cellular network support evolved packet system (EPS) fallback procedure;
receive, from the first cellular network, a request to perform measurements of one or more neighboring cells of a second cellular network that does not support network slicing;
perform one or more measurements of one or more cells of the second cellular network;
receive or initiate a voice call with another UE;
adjust the one or more measurements of the UE such that an EPS fallback procedure is deemphasized, wherein the EPS fallback procedure is associated with a transition to the second cellular network; and
receive signaling from the first cellular network to establish, based at least in part on the one or more measurements of the UE that have been adjusted, the voice call as a VoNR call via the first cellular network, wherein the network slice is maintained during the VoNR call.

10. The apparatus of claim 9, wherein the request to perform measurements of one or more neighboring cells of the second cellular network comprises an inter-radio access technology (IRAT) cell measurement and reporting configuration.

11. The apparatus of claim 9, wherein the one or more measurements are adjusted below a threshold value.

12. The apparatus of claim 9, wherein the at least one processor is further configured to cause the UE to:
adjust one or more capabilities of the UE such that an EPS fallback procedure is deemphasized.

13. The apparatus of claim 12, wherein the at least one processor is further configured to cause the UE to:
determine, as part of a UE capability sharing procedure between the UE and the first cellular network, whether or not one or more feature flag equalities are satisfied, wherein the one or more capabilities comprise the one or more feature flag equalities including VoIMS=True, VOLTESupported=True, and VoNrSupported=True.

14. The apparatus of claim 13, wherein adjusting the one or more measurements of the UE such that an EPS fallback procedure is deemphasized comprises switching VOLTESupported=True to VOLTESupported=False.

15. A wireless device, comprising:
wireless communication circuitry; and
at least one processor coupled to the wireless communication circuitry and configured to cause the wireless device to:
initiate an application on the wireless device, wherein the application utilizes a network slice via a packet data network (PDN) connection with a first cellular network, wherein the first cellular network supports network slicing and voice over new radio (VoNR), and wherein one or more cells of the first cellular network support evolved packet system (EPS) fallback procedures;
receive or initiate a voice call with another wireless device;
perform an EPS fallback procedure, wherein the EPS fallback procedure transitions the wireless device from the first cellular network to a second cellular network that does not support network slicing;
receive signaling from the second cellular network to establish the voice call via the second cellular network, wherein the network slice is not utilized via the PDN connection with the first cellular network during the voice call;
retransition, based at least in part on the voice call being disconnected from the second cellular network and the application remaining initiated, to the first cellular network; and
resume utilization of the network slice via the PDN connection with the first cellular network.

16. The wireless device of claim 15, wherein the application is being executed in a foreground of the wireless device.

17. The wireless device of claim 15, wherein VoNR is disabled on the wireless device based at least in part on the wireless device being in a do-not-disturb (DND) mode.

18. The wireless device of claim 17, wherein the voice call is a mobile terminated (MT) call, and wherein at least one processor is further configured to cause the wireless device to:
transmit, in response to receiving the MT call and based at least in part on the wireless device being in a DND mode, a reject message to the network.

19. The wireless device of claim 15, wherein the at least one processor is further configured to cause the wireless device to:
  enable VoNR on the wireless device.

20. The wireless device of claim 19, wherein the retransition to the first cellular network is triggered based on VoNR being enabled on the wireless device and the application running in a foreground of the wireless device.

\* \* \* \* \*